(12) United States Patent
White (10) Patent No.: US 11,063,896 B2
(45) Date of Patent: *Jul. 13, 2021

(54) SYSTEM AND METHOD FOR DETECTING CONFIDENTIAL INFORMATION EMAILS

(71) Applicant: Palantir Technologies Inc., Palo Alto, CA (US)

(72) Inventor: Nicholas White, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,375

(22) Filed: May 20, 2019

(65) Prior Publication Data

US 2019/0281004 A1 Sep. 12, 2019

Related U.S. Application Data

(63) Continuation of application No. 14/141,252, filed on Dec. 26, 2013, now Pat. No. 10,356,032.

(51) Int. Cl.
| | | |
|---|---|---|
| *G06F 15/16* | (2006.01) | |
| *H04L 12/58* | (2006.01) | |
| *G06Q 10/10* | (2012.01) | |
| *H04L 12/24* | (2006.01) | |

(52) U.S. Cl.
CPC ............. *H04L 51/28* (2013.01); *G06Q 10/10* (2013.01); *G06Q 10/107* (2013.01); *H04L 41/0816* (2013.01)

(58) Field of Classification Search
CPC ..... H04L 51/28; H04L 41/0816; H04L 51/12; H04L 12/58; G06Q 10/10; G06Q 10/107
See application file for complete search history.

(56) References Cited

U.S. PATENT DOCUMENTS

| | | | | |
|---|---|---|---|---|
| 6,691,156 | B1 * | 2/2004 | Drummond | G06Q 10/107 |
| | | | | 709/203 |
| 7,698,370 | B1 * | 4/2010 | Hall | H04L 51/28 |
| | | | | 709/206 |
| 7,774,431 | B2 * | 8/2010 | Conn | G06F 16/4393 |
| | | | | 709/219 |
| 8,271,597 | B2 * | 9/2012 | Rashad | H04L 51/28 |
| | | | | 709/206 |
| 10,162,887 | B2 | 12/2018 | Kesin et al. | |
| 10,356,032 | B2 | 7/2019 | White | |
| 2002/0029248 | A1 * | 3/2002 | Cook | G06Q 30/0601 |
| | | | | 709/206 |
| 2003/0018798 | A1 * | 1/2003 | Lee | H04L 63/10 |
| | | | | 709/231 |

(Continued)

*Primary Examiner* — Razu A Miah
(74) *Attorney, Agent, or Firm* — Knobbe, Martens, Olson & Bear, LLP (57) ABSTRACT

Systems and methods are disclosed for detecting confidential information emails. In accordance with one implementation, a method is provided for detecting confidential information emails. The method includes obtaining a sender address of an electronic message, the sender address comprising a first username and a first domain name, and obtaining at least one recipient address of the electronic message, the recipient address comprising a second username and a second domain name. The method also includes determining whether the recipient address and the sender address are different addresses of a user, and based on the determination, flagging the electronic message.

14 Claims, 4 Drawing Sheets

(56) References Cited

U.S. PATENT DOCUMENTS

| | | | |
|---|---|---|---|
| 2003/0023695 A1* | 1/2003 | Kobata | G06Q 10/107 709/206 |
| 2003/0078981 A1* | 4/2003 | Harms | G06Q 10/107 709/206 |
| 2005/0021635 A1* | 1/2005 | Graham | G06Q 10/107 709/206 |
| 2005/0169274 A1* | 8/2005 | Shuster | H04L 61/35 370/392 |
| 2005/0204009 A1 | 9/2005 | Hazarika et al. | |
| 2006/0031306 A1* | 2/2006 | Haverkos | H04L 51/12 709/206 |
| 2006/0080396 A1* | 4/2006 | Enatsu | H04L 12/1496 709/206 |
| 2006/0168066 A1* | 7/2006 | Helsper | G06Q 10/107 709/206 |
| 2007/0038696 A1* | 2/2007 | Kenna | G06Q 30/0272 709/201 |
| 2009/0154396 A1* | 6/2009 | Akiyoshi | H04L 41/12 370/328 |
| 2009/0182818 A1* | 7/2009 | Krywaniuk | H04L 51/28 709/206 |
| 2009/0292785 A1* | 11/2009 | Leedberg | G06Q 10/107 709/206 |
| 2009/0319418 A1 | 12/2009 | Herz | |
| 2011/0252104 A1* | 10/2011 | Nachum | H04L 63/02 709/206 |
| 2012/0191786 A1* | 7/2012 | Downing | G06Q 10/107 709/206 |
| 2013/0246537 A1* | 9/2013 | Gaddala | G06Q 50/01 709/206 |
| 2014/0229422 A1 | 8/2014 | Jain et al. | |
| 2015/0039761 A1* | 2/2015 | Patil | G06Q 50/01 709/225 |
| 2016/0036754 A1* | 2/2016 | Mese | H04L 51/00 709/206 |
| 2019/0108278 A1 | 4/2019 | Kesin et al. | |

\* cited by examiner

SYSTEM AND METHOD FOR DETECTING CONFIDENTIAL INFORMATION EMAILS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Intellectual property is one of several key assets held by companies today. Accordingly, companies are always looking for ways to control their confidential and trade-secret information and to ensure that it is not disseminated to third parties. Most of that information is stored in a digital format nowadays, and can typically be accessed from electronic devices (e.g., desktops, laptops, tablet computers, smart phones, etc.) that are often provided by the company to its employees. While a company has some control and oversight over its own electronic devices, it loses any such control once the confidential information leaves the company device and is transferred to another device, such as a personal email account. Accordingly, identifying such transfer of confidential information can help the company better protect its intellectual property.

BRIEF DESCRIPTION OF THE DRAWINGS

Reference will now be made to the accompanying drawings which illustrate exemplary embodiments of the present disclosure. In the drawings.

DESCRIPTION OF EXEMPLARY EMBODIMENTS

As discussed above, it is a major concern of a company when confidential information is transferred (moved or copied) from a company device to another device. In such a situation, it is particularly concerning where a company employee sends information from his company device or account to his personal device or account. One example of this is an employee sending an email from the employee's corporate email account (accessing it either from a company device or another device) to the employee's personal email account. Such activity is particularly suspicious because it may indicate that an employee is deliberately transferring the information away from the company device or account, in order to later share it with a third party or otherwise misappropriate it. Therefore, it would be advantageous to have a system and a method for detecting emails sent from an employee's corporate email account to the employee's personal email account.

Reference will now be made in detail to several exemplary embodiments of the present disclosure, including those illustrated in the accompanying drawings. Whenever possible, the same reference numbers will be used throughout the drawings to refer to the same or like parts.

Figure 1:
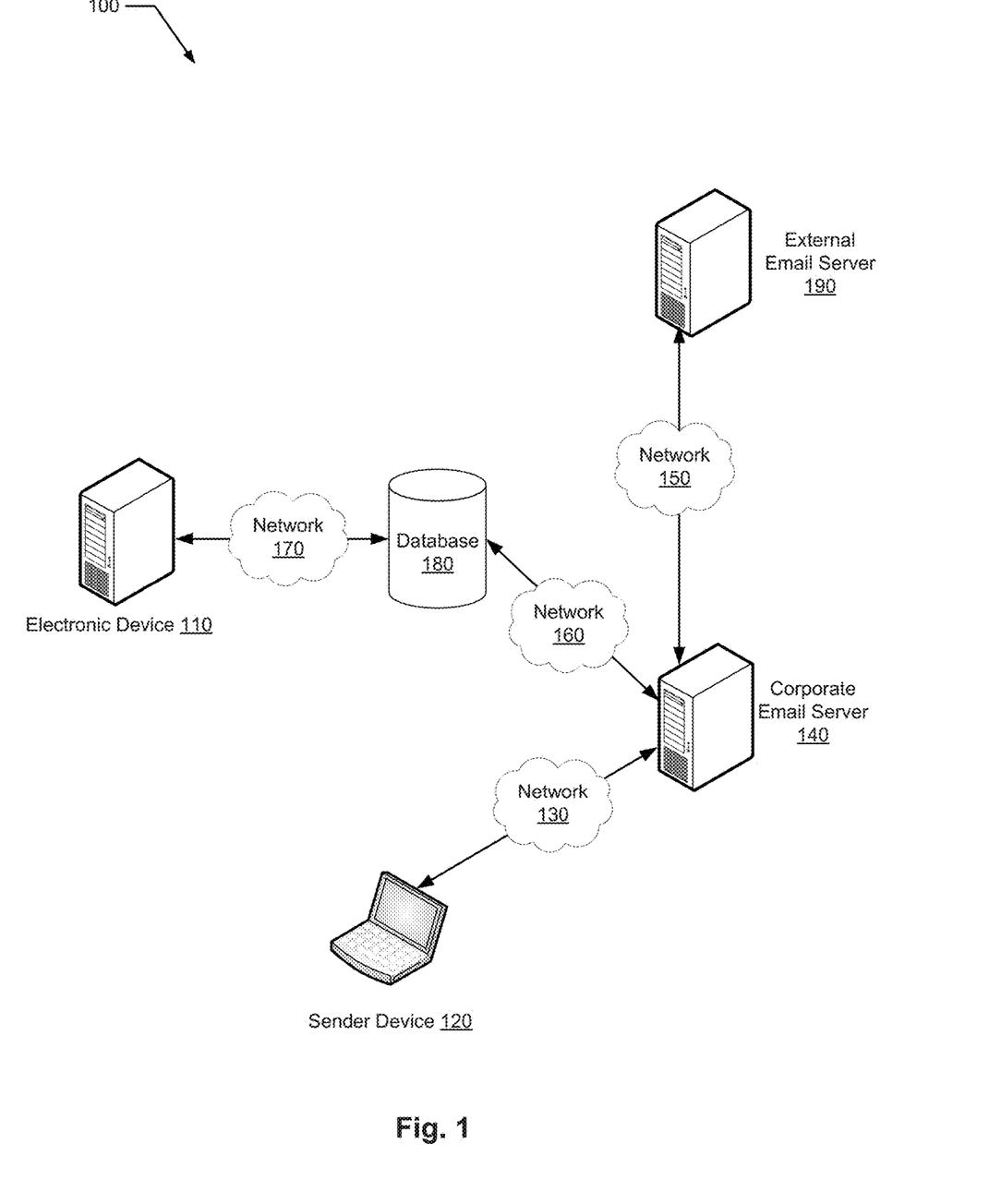
FIG. 1 is a block diagram of an exemplary system, consistent with embodiments of the present disclosure.

Reference is now made to FIG. 1, which illustrates, in block diagram form, an exemplary system 100. As shown in FIG. 1, system 100 can include, for example, an electronic device 110 coupled either directly or through a network 170 to a database 180, which is coupled either directly or through a network 160 to a corporate email server 140. System 100 can also include a sender device 120 that is coupled either directly or through a network 130 to corporate email server 140, which is coupled through a network 150 to one or more external email servers 190.

Database 180 can be any type of database that stores digital data. Database 180 can include an email database (not shown) storing email data obtained from corporate email server 140. Database 180 can also include a name database (not shown) storing name data in association with email address data. Database 180 can also include a nickname database (not shown) storing nickname data in association with name data. For example, the nickname database can include the following nicknames in association with the name Richard: Rich, Richie, Ricky, and Dick. The three databases discussed above are illustrated as being part of the same database 180, but it is appreciated that the three devices may or may not be a part of the same physical device, and can be located on different physical devices (e.g., servers) and on different networks. Moreover, it is appreciated that the information stored in the email database, name the database, and the nickname database can be accumulated in less than three databases. In some embodiments, database 180 can be implemented as a data fusion system 300, described in more detail below in FIG. 3, discussed in detail below.

The email database can store email data of all emails sent from sender device or process (e.g. automated emails) through corporate email server 140 or only some of those emails. For example, the email database can store all emails sent through corporate email server 140 within the last predefined period of time (e.g., the last day, the last week, etc.)

In some embodiments, database 180 can be stored on a separate server which can be accessed by electronic device 110 either directly or through network 170. In other embodiments, database 180 can be physically stored on corporate email server 140. In yet other embodiments, database 180 can be physically stored on electronic device 110. In some embodiments, parts of database 180 can be omitted. For example, database 180 may not include the email database, and the electronic device can obtain and process email data from corporate email server 140 in real time, as the emails are being sent.

Corporate email server 140 can be any type of an email server such as a Microsoft Exchange Server, Novell Groupwise, Open-Xchange, or any other email server that supports sending, storing, and/or receiving of emails. Corporate email server 140 can receive outgoing email data from sender device 120, identify, based on the outgoing email data, an appropriate external email server 190, and send the outgoing email data to the identified external email server 190. Corporate email server 140 could also be one or more servers in a chain of email servers that route messages from the sender to the external email server.

External email server 190 can be any type of one or more email servers that can be accessed by users directly or remotely (e.g., via the Internet), receive and store incoming emails, and/or send outgoing emails. Examples of external email servers 190 include popular servers open to the public, such as Gmail, Yahoo Mail, Hotmail, as well as proprietary email servers serving one or a limited number of users, such as an email server running on a user's personal computer.

An email server, such as corporate email server 140 or external email server 190, can be associated with one or more IP addresses (e.g., "68.142.240.31") that uniquely identify the server within its network (e.g., the Internet). An email server can also be associated with one or more domain names (e.g., "yahoo.com"). For brevity purposes, IP addresses and domain names will be collectively referred to herein as "domain names."

Electronic device 110 can be one or more electronic devices of any type that can obtain email data from corporate email server 140 either directly (not shown) or through database 180. Exemplary embodiments of electronic device 110 are discussed in more detail below, in connection with FIG. 4.

Networks 130, 150, 160, and 170, can each be any type of wireless and/or wired network such as a local area network (LAN) and/or a wide area network (WAN) (e.g., the Internet).

Sender device 120 can be a stationary electronic device (e.g., a PC) or a mobile electronic device (e.g., a cellular phone, a smartphone, a tablet, a netbook, a laptop, a PDA, etc.) or any other type of electronic device having a processor and capable of receiving input data, such as email data, from a user, and communicating with corporate email server 140, either directly or through network 130. Sender device 120 can be owned by a company and provided for an employee for the duration of employment, or it can be the employee's personal device. Sender device 120 can have an email client application that can facilitate receiving input data from the user and communicating with corporate email server 140. The email client application can be a standalone application such as Microsoft Outlook, an internet browser providing access to corporate email server 140 through web protocols (e.g., HTTP or HTTPS) or any other type of application.

In some embodiments, sender device 120 receives email data from a user (e.g., using the email client application), processes and optionally modifies the email data, and sends the (optionally modified) email data to corporate email server 140. Upon receiving the email data, corporate email server 140 can optionally modify the email data, identify, based on the email data, one or more external email servers to which the email data should be sent, and send a copy of the (optionally modified) email data to each of the identified external email servers. Corporate email server 140 can send the email data using a Simple Mail Transfer Protocol (SMTP), or using any other protocol suitable for sending email data. Each of the identified external email servers, upon receiving the email data can identify, based on the email data, one or more recipient users, and store the received email data in association with the identified recipient users. The recipient users can then log into their respective accounts at the identified external email servers, and retrieve the email data. The logging in and the retrieval can be implemented via protocols such as Post Office Protocol (POP), Internet Message Access Protocol (IMAP), via a web application, or using any other suitable method.

The email data can include, among other things, a subject, a body, one or more attachments (files), header information, one or more recipient addresses and a sender address.

Each recipient addresses can include, for example, a local part, an "at" sign ("@"), and a domain part. For example, in the electronic address "john.doe123@yahoo.com" the local part is "john.doe123" and the domain part is "yahoo.com". In some embodiments, the domain part of the recipient address can be associated with a particular external email server 190. For instance, in the above example, domain part "yahoo.com" is associated with an external email server belonging to Yahoo! Inc. In some embodiments, the local part of the recipient address can correspond to a username associated with one of the users of the external email servers associated with the domain part. For instance, in the above example, local part "john.doe123" can correspond to the username of a user (e.g., named John Doe) that has an email account on the external email server belonging to Yahoo! Inc. Accordingly, for purposes of brevity, the local part is hereinafter referred to as the "username."

The one or more recipient addresses within the email data can be entered by the user (e.g., from sender device 120 via the email client application) who can specify the addresses, for example, by typing them in manually, or by selecting them from an address book. In some embodiments, the user can designate each recipient addresses as a "TO" address, a "CC" address, or a "BCC" address.

As discussed above, corporate email server 140 can identify, based on the email data, one or more external email servers, and send each of these external email servers a copy of the email data. In some embodiments, corporate email server 140 identifies the external email servers by retrieving the recipient addresses from the email data, and determining (e.g., using a database) which external email servers are associated with the domain parts of the recipient addresses.

As discussed above, in addition to the one or more recipient addresses, the email data can include a sender address. The sender address can be input by the user manually, or it can be automatically added to the email data by either sender device 120 or corporate email server 140. In some embodiments, the sender address can have a local part (a username), an "at" ("@") sign, and a domain part, similarly to the recipient address, discussed above. In some embodiments, the domain part of the sender address can be associated with and uniquely identify corporate email server 140, either of the employee's company or one of its subsidiaries, parent, or sibling companies, or any other company associated with the employee's company. For example, a domain name associated with corporate email server of corporation Example can be "example.com". The username in the sender address is associated with the user sending the email data (e.g., a company employee).

In some embodiments, the username in the sender address can correspond to the user's real name. In addition, the username can be formatted in accordance with a predetermined format. The format can dictate, for example, that the username include the first and the last name of the user and be separated by a period (e.g., "john.doe"). As another example, the format can dictate that the username include the first initial and the last name of the user (e.g., "j.doe") or the first name and the last initial (e.g., "john.d"). Other formatting examples include "john," "jdoe," doej," johnd," "djohn," and so forth. In yet other examples, the username can include additional characters such as underscores ("_"), dashes ("-"), digits (e.g., "john.doe1" and "john.doe2" where there are two or more employees named John Doe) or middle initials (again, for the scenario where there are several employees with the same first and last names).

Electronic device 110 can obtain the email that is being sent or was sent through corporate email server 140. In some embodiments, electronic device 110 can receive the email data in real time, simultaneously (or substantially simultaneously) with it being received by corporate email server 140 from sender device 120 and sent over to one or more external email servers 190. In other embodiments, the electronic device can obtain the email data from database 180. Database 180 can be updated (e.g., by corporate email server 140) any time an email is being sent through corporate email server 140, and database 180 can temporarily or permanently store email data of one or more such emails.

Figure 2:
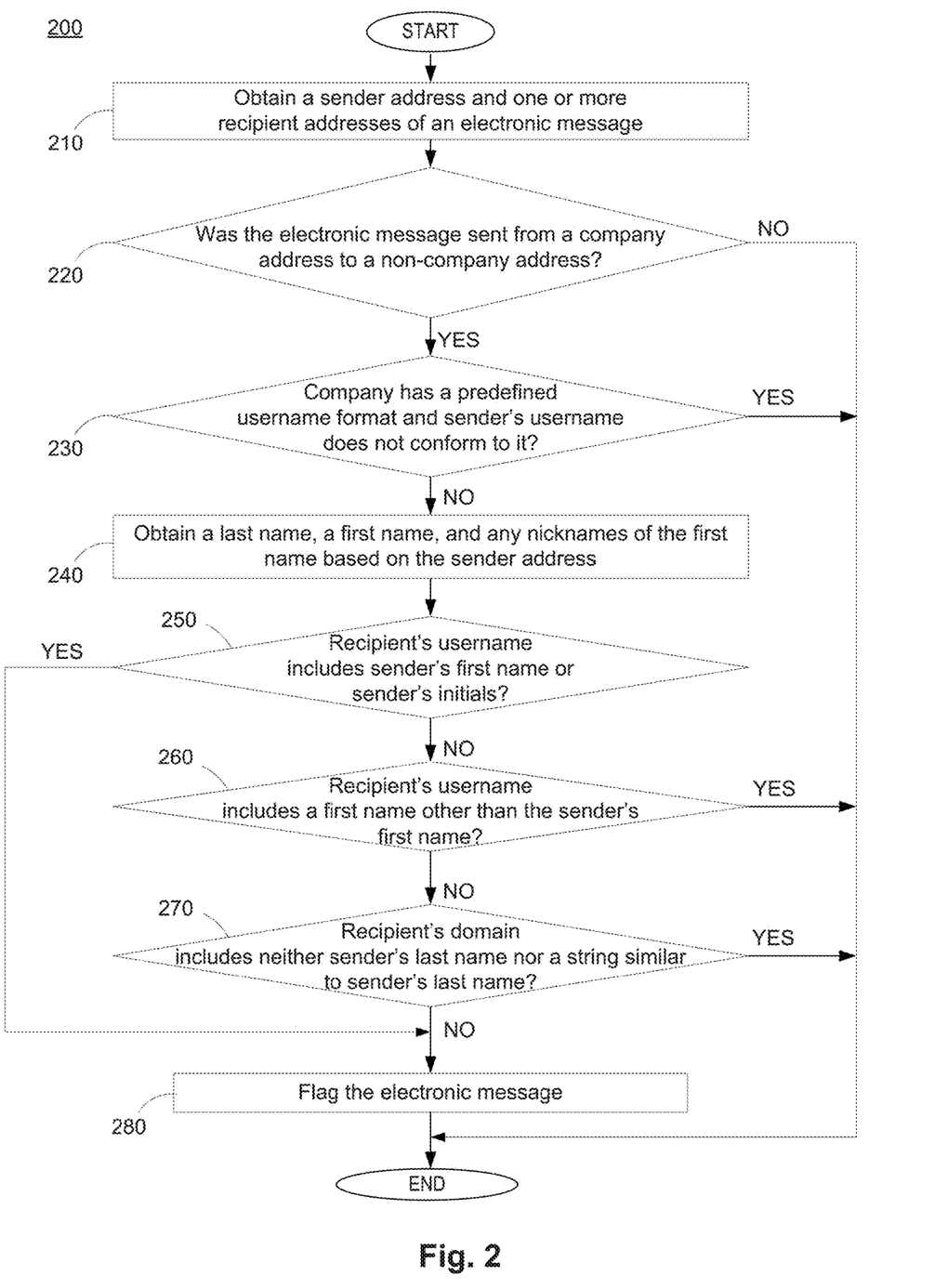
FIG. 2 is a flowchart of an exemplary method for detecting confidential information emails, consistent with embodiments of the present disclosure.

Referring now to FIG. 2, a flowchart representing an exemplary method 200 for detecting confidential information emails is presented. Method 200 can be performed by one or more electronic devices, such as electronic device 110. While method 200 and the other following embodiments described herein can be performed by multiple electronic devices, for purposes of simplicity and without limitation, these embodiments will be explained with respect to a single electronic device. While the flowchart discloses the following steps in a particular order, it will be appreciated that at least some of the steps can be moved, modified, or deleted where appropriate, consistent with the teachings of the present disclosure.

At step 210, the electronic device obtains an electronic message (e.g., an email). The electronic message can be obtained from any source, such as a database (e.g., the email database in database 180) that contains one or more electronic messages. After obtaining the electronic message, the electronic device extracts from the electronic message a sender address and one or more recipient addresses. As discussed above, the sender address and the recipient addresses can each include a username portion and a domain name portion.

At step 220, the electronic device determines whether the electronic message was sent from a company address to a non-company address. To make this determination, the electronic device can obtain a list of one or more domain names associated with a given company (or companies associated therewith), or more particularly, domain names associated with one or more corporate email servers associated with the company (or companies associated therewith). The electronic device can then determine whether the domain name portion of the sender address is within the list of domain names associated with the company. If not, the electronic message was probably not sent from a corporate account, and the electronic device can discard this electronic message and end the method.

Still referring to step 220, the electronic device can also determine whether the electronic message has more than one recipient address. Since most suspicious messages are those sent to one recipient, messages that have multiple recipient addresses can be discarded and the electronic device can end the method. In some embodiments (not shown), the electronic device may not discard such messages, accounting for the possibility that the user has several personal accounts and that the user sent confidential information to more than one personal account or to a group of co-conspirators. For brevity purposes, and without limiting the scope of the disclosure, it will be assumed in the following examples that a message with multiple recipients is not a suspicious electronic message and is discarded at step 220.

Still referring to step 220, the electronic device can determine whether the (only) recipient address has a domain name that is within the list of domain names associated with the company. Because this indicates that the message was sent to someone within the company, such message can be discarded and the method can end. It will be appreciated that the above determinations of step 220 can be performed in any order. If the answer to all these determinations is "no," the method can proceed to step 230.

At step 230, the electronic device can determine whether the username of the sender address does not conform to any predefined format for all usernames associated with the company's employees. If the sender's username does not conform to the predefined company format this can mean, for example, that the message was automatically generated by a company computer. For example, it could be an automatic message sent from a sender address "donotreply@example.com." So if the username does not conform to the format, the electronic device can discard the electronic message and the method can end. For example, if a company has a predefined format dictating that all company usernames must include a period ("."), the electronic device can discard all messages whose sender address username does not include a period. Another example of a predefined format can be that all usernames must start with one alphabetic character, must be followed by a period, followed by at least two alphabetic characters, and followed by any number of alphanumeric characters. If the company does not have a predefined format or if the sender's username does conform to the predefined format, the method can proceed to step 240.

At step 240, the electronic device can obtain, based on the sender address, the sender's first name, middle name, last name, and any nicknames (or synonyms) of the first name. In some embodiments, the electronic device can obtain the sender's first, middle, and last names by extracting them from the sender address. For example, if the predefined company format discussed above is <first name>.<last name>@<company domain> then the first and last name (but not the middle name) of the sender can be extracted from the sender address.

In other embodiments, for higher reliability, the electronic device can obtain the first and last name of the sender by querying a database (e.g., the name database) that stores all employee usernames in association with their full names. The electronic device can send to the database the sender's username and receive back the sender's first name, last name, and optionally, a middle name or a middle initial.

Still referring to step 240, the electronic device can also obtain one or more nicknames associated with the sender's first name, for example, by querying a database (e.g., the nickname database). For purposes of brevity, the obtained first name and the obtained nicknames (if any) are collectively referred to as the sender's "first names." In some embodiments (not shown), in addition to retrieving nicknames for the first name, the electronic device can also obtain nicknames for the sender's middle name, and perform the next steps on nicknames that include the first name, the middle name, and any synonyms thereof.

At step 250, the electronic device can determine whether the recipient's username (the username portion of the recipient address) includes any of sender's first names obtained at step 240 or sender's initials. The electronic device can first remove from the recipient's username any non-alphabetic characters (e.g., digits, punctuation characters, spaces, etc.). The electronic device can then determine whether the remaining username includes sender's last name, and if so, remove the last name from the username. In some embodiments, if the electronic device determines that the last name is not included, it can further determine whether the remaining username either starts or ends with the sender's last initial, and if so, remove the last initial. The electronic device can then determine whether the remaining portion of the username corresponds to any of the first names (which includes any corresponding nicknames) of the sender. If it does, there is a high probability that the sender is sending the message to his own account (on an external email server), because the chances of someone sending a message to another person with the same first name are relatively low. Accordingly, if the remaining portion of the recipient's username corresponds to any of the first names, the electronic device can move to step 280.

If the remaining portion of the username does not contain any of the sender's first names, the electronic device can further determine whether the remaining portion of the username consists only of the sender's first initial (first letter of the first name or any corresponding nickname), of any combination of the sender's first initial and last initial, or of any combination of any two or all three of: the sender's first initial, last initial, and middle initial. If so, the electronic device can move to step 280. Otherwise, the method proceeds to step 260. In some embodiments, before proceeding to step 260, the processor further determines whether the remaining portion of the username includes the sender's first and last initials with one or two other characters (which could be initials) in between, and if so, the electronic device can move to step 280. Otherwise, the method proceeds to step 260.

At step 260, the electronic device can determine whether the username includes some first name other than any of sender's first names. For example, the electronic device can query the name database and/or the nickname databases to obtain all possible first names and their nicknames, and determine whether the remaining portion of the recipient's username includes any of those. If so, the electronic device can discard this message (as the recipient is likely to be a family member) and the method can end. Otherwise, the method proceeds to step 270.

At step 270, the electronic device can determine whether the recipient domain name includes the sender's last name. Because a person may have a personal domain name and personal domain names often include the person's last name (e.g., "smith.com," "thesmiths.net," etc.) a recipient domain name including the sender's last name can indicate that the message was sent to the sender's personal account. However, in some embodiments, if the employee has a last name shorter than a predefined threshold (e.g., 4 characters), step 270 can be skipped, as it could result in too many false positives (e.g. a last name "mai" could result in all emails sent to gmail.com being flagged).

If the electronic device determines, at step 270, that the recipient's domain name includes neither the sender's last name, it can discard the electronic message and the method can end. Otherwise, the electronic device can proceed to step 280.

In some embodiments, the electronic device can account for the possibility that the recipient's and/or the sender's first, middle, or last names can be misspelled. In these embodiments, when the electronic device determines in any of the steps of method 200 whether an email address (either recipient's or sender's, either in the username portion or the domain name portion) includes a particular name (either recipient's or sender's, either the last, the first, or the middle name) instead of determining whether the address includes the exact name, the processor can determine whether the address includes a string that is similar to the particular name. For example, the processor can determine whether the address includes a string that is within a predetermined edit distance, such as Levenshtein distance, from the particular name. For example, at step 270, the electronic device can determine whether the recipient domain name includes a string that is within a Levenshtein distance of 2 from the user's last name. Thus, the electronic device can determine that domain name "smitz.com" is similar to the sender's last name Smith, because "smitz" is within a Levenshtein distance of 1 from "smith." It is appreciated that any string operations (e.g., comparisons) in this and other steps of method 200 may or may not be case sensitive, encoding sensitive, or transliteration sensitive. For example, the processor can determine that the character "U" is equivalent to "u" and to "ü".

At step 280, the electronic device flags the electronic message. The flagging can include, for example, providing an indication (e.g., to an operator operating the electronic device) that the electronic message is "suspicious" and requires further review. For example, the electronic device can be coupled to a display, and can show on that display information identifying the electronic message (or the entire electronic message), and an indication to the operator that the identified electronic message is suspicious and needs to be evaluated for any confidential content inappropriately sent to an external server. The flagging can also include, for example, storing a copy of the electronic message in a predefined location, modifying the email database to indicate that this particular electronic message is suspicious and needs to be further evaluated, and/or flagging the electronic message as suspicious in an existing alerting or monitoring system. After step 280 the method can end.

After ending method 200, the electronic device can check if there are any additional unprocessed electronic messages in the database (e.g., database 180) and if so, perform method 200 on the next electronic message in the database. Moreover, in order to minimize processing, it is appreciated that method 200 can be performed across multiple electronic messages sent by a single sender address or received by a recipient address. For example, if there are several electronic messages sent by a single sender address to one or more recipient addresses, determination step 250 could be performed for all electronic messages from that single sender address before proceeding to determination step 260, where all remaining messages that have not been reported can be processed.

Furthermore, because, as discussed below, method 200 can be performed by one or more electronic devices, and because method 200 can process each electronic message in isolation, different electronic messages can be processed by different electronic devices, thereby spreading the computational load and reducing latency between the time that a message is sent and the time that method 200 is applied to it. For example, each new message can be given for processing to the first device that is not busy processing another message at the time.

In addition, because the method can determine whether the electronic message is suspicious or not based only on the recipient and/or sender addresses, and does not have to consider the electronic message's subject line, body, attachments, headers or any other information, the method can be performed in a minimal time and with minimal resources, allowing the processing of millions and even billions of emails within reasonable times.

Figure 3:
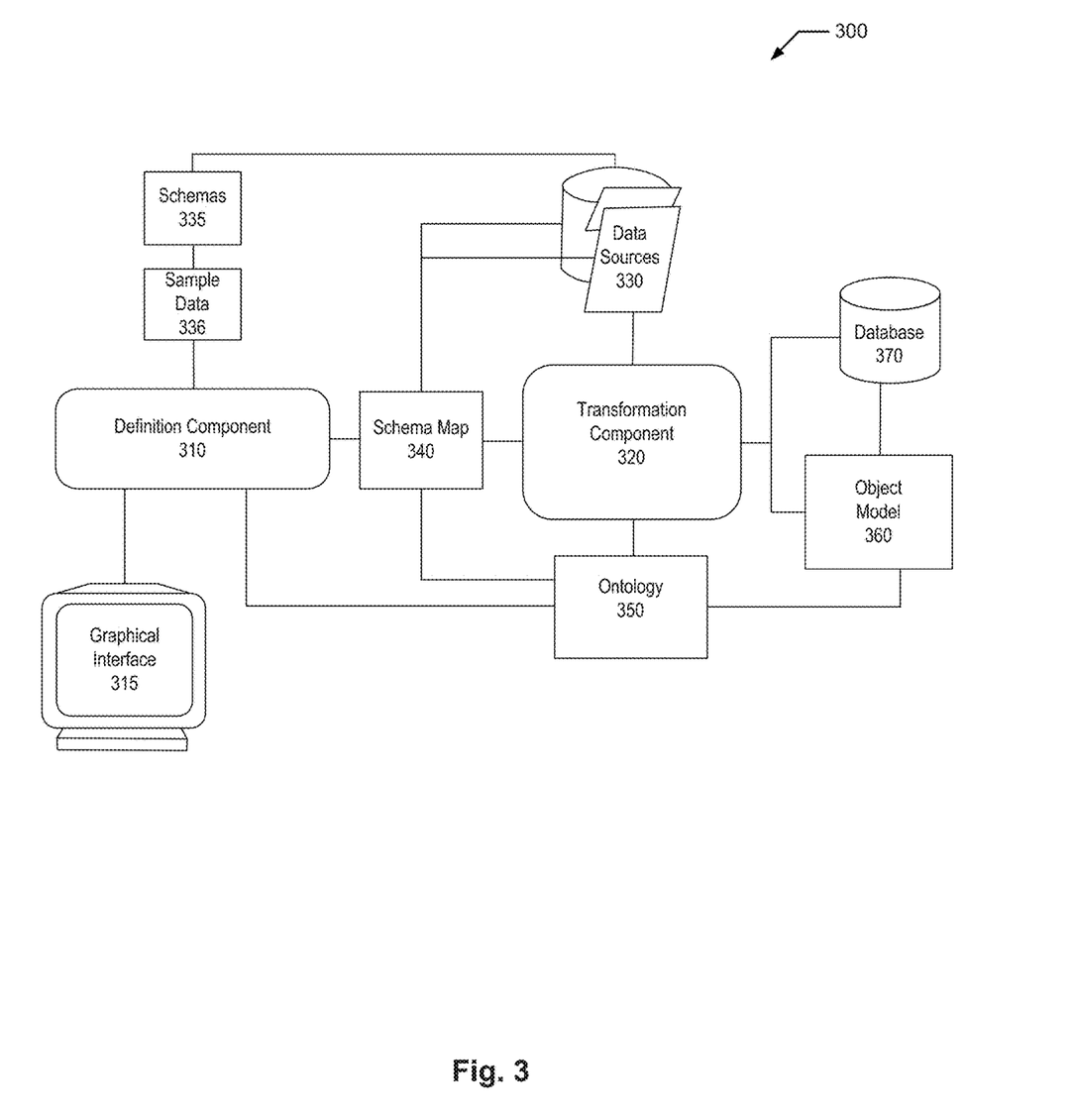
FIG. 3 is a block diagram of an exemplary data fusion system, consistent with embodiments of the present disclosure.

As discussed above, database 180 can, in some embodiments, be implemented as a data fusion system. In some embodiments, electronic device 110 and network 170 can also be included in the data fusion system. FIG. 3 shows, in block diagram form, an exemplary data fusion system 300, consistent with embodiments of the present disclosure. Among other things, system 300 facilitates transformation of one or more data sources, such as data sources 330, into an object model 360, whose semantics are defined by an ontology 350. The transformation can be performed for a variety of reasons. For example, a database administrator can wish to import data from data sources 330 into a database 370 for persistently storing object model 360. As another example, a data presentation component (not depicted) can transform input data from data sources 330 "on the fly" into object model 360. Object model 360 can then be utilized, in conjunction with ontology 350, for analysis through graphs and/or other data visualization techniques.

System 300 comprises a definition component 310 and a translation component 320, both implemented by one or more processors on one or more computing devices executing hardware and/or software-based logic for providing various functionality described herein. As will be appreciated from the present disclosure, system 300 can comprise fewer or additional components that provide various functionalities described herein. Such components are, for clarity, omitted from FIG. 3. Moreover, the component(s) of system 300 responsible for providing various functionalities can further vary from embodiment to embodiment.

Definition component 310 generates and/or modifies ontology 350 and a schema map 340. Exemplary embodiments for defining an ontology (such as ontology 350) are described in U.S. Pat. No. 7,962,495 (the '495 Patent), issued Jun. 14, 2011, the entire contents of which are expressly incorporated herein by reference. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}—>Name: Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring to FIG. 3, schema map 340 can define how various elements of schemas 335 for data sources 330 map to various elements of ontology 350. Definition component 310 receives, calculates, extracts, or otherwise identifies schemas 335 for data sources 330. Schemas 335 define the structure of data sources 330—for example, the names and other characteristics of tables, files, columns, fields, properties, and so forth. Definition component 310 furthermore optionally identifies sample data 336 from data sources 330. Definition component 310 can further identify object type, relationship, and property definitions from ontology 350, if any already exist. Definition component 310 can further identify pre-existing mappings from schema map 340, if such mappings exist.

Based on the identified information, definition component 310 can generate a graphical interface 315. Graphical interface 315 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 315 features a visual workspace that visually depicts representations of the elements of ontology 350 for which mappings are defined in schema map 340. Graphical interface 315 also includes controls for adding new elements to schema map 340 and/or ontology 350, including objects, properties of objects, and relationships, via the visual workspace. After elements of ontology 350 are represented in the visual workspace, graphical interface 315 can further provide controls in association with the representations that allow for modifying the elements of ontology 350 and identifying how the elements of ontology 350 correspond to elements of schemas 335. Optionally, the graphical interface 315 can further utilize sample data 336 to provide the user with a preview of object model 360 as the user defines schema map 340. In response to the input via the various controls of graphical interface 315, definition component 310 can generate and/or modify ontology 350 and schema map 340.

In some embodiments, graphical interface 315 can provide an interface providing a user with the ability to add structure to an unstructured document stored in data sources 330 by tagging one or more portions (e.g., text) within the document. Defining tags and applying these tags to a portion of the document can create object, properties, or links creating a relationship between one or more objects and/or properties.

Transformation component 320 can be invoked after schema map 340 and ontology 350 have been defined or redefined. Transformation component 320 identifies schema map 340 and ontology 350. Transformation component 320 further reads data sources 330 and identifies schemas 335 for data sources 330. For each element of ontology 350 described in schema map 340, transformation component 320 iterates through some or all of the data items of data sources 330, generating elements of object model 360 in the manner specified by schema map 340. In some embodiments, transformation component 320 can store a representation of each generated element of object model 360 in a database 370. In some embodiments, transformation component 320 is further configured to synchronize changes in object model 360 back to data sources 330.

Data sources 330 can be one or more sources of data, including, without limitation, spreadsheet files, databases, email folders, document collections, media collections, contact directories, and so forth. Data sources 330 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 330 can include data structures stored persistently in non-volatile memory. Data sources 330 can also or alternatively include temporary data structures generated from underlying data sources via data extraction components, such as a result set returned from a database server executing a database query. Data sources 330 can include or be synchronized with external data sources, such as one or more mobile location registers 112 and/or other location registers 116.

In some embodiments, data sources 330 can include any or all of the data of database 180 discussed above in connection with FIG. 1. Thus, data sources 330 can include, for example, the email database, the name database, and the nickname database discussed above.

Schema map 340, ontology 350, and schemas 335 can be stored in any suitable data structure(s), such as XML files, database tables, and so forth. In some embodiments, ontology 350 is maintained persistently. Schema map 340 can or cannot be maintained persistently, depending on whether the transformation process is perpetual or a one-time event. Schemas 335 need not be maintained in persistent memory, but can be cached for optimization.

Object model 360 comprises collections of elements such as typed objects, properties, and relationships. The collections can be structured in any suitable manner. In some embodiments, a database 370 stores the elements of object model 360, or representations thereof. In some embodiments, the elements of object model 360 are stored within database 370 in a different underlying format, such as in a series of object, property, and relationship tables in a relational database.

According to some embodiments, the operations, techniques, and/or components described herein can be implemented by the electronic device (e.g., electronic device 110), which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
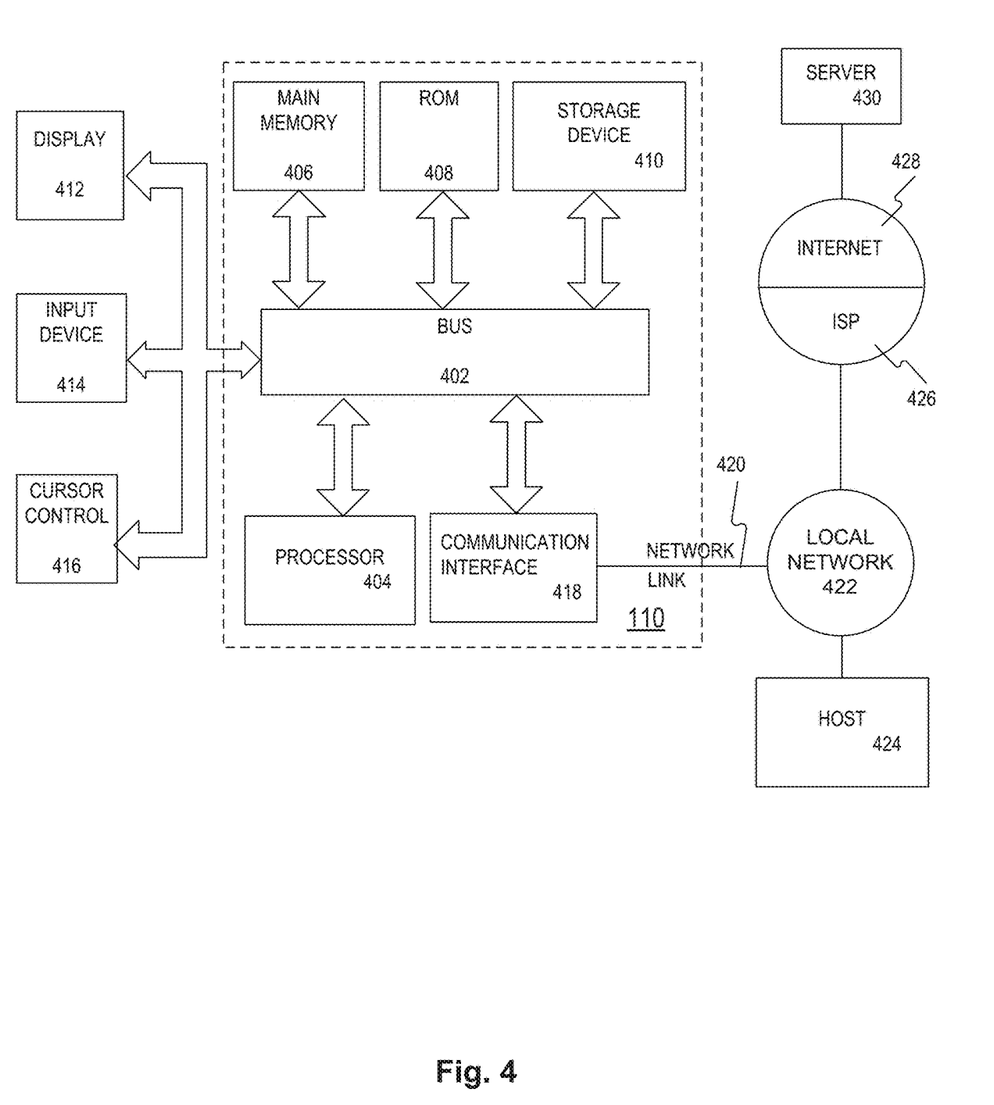
FIG. 4 is block diagram of an exemplary electronic device with which embodiments of the present disclosure can be implemented.

By way of example, FIG. 4 is a block diagram that illustrates an implementation of electronic device 110, which, as described above, can comprise one or more electronic devices. Electronic device 110 includes a bus 402 or other communication mechanism for communicating information, and one or more hardware processors 404, coupled with bus 402 for processing information. One or more hardware processors 404 can be, for example, one or more general purpose microprocessors.

Electronic device 110 also includes a main memory 406, such as a random access memory (RAM) or other dynamic storage device, coupled to bus 402 for storing information and instructions to be executed by processor 404. Main memory 406 also can be used for storing temporary variables or other intermediate information during execution of instructions to be executed by processor 404. Such instructions, when stored in non-transitory storage media accessible to one or more processors 404, render electronic device 110 into a special-purpose machine that is customized to perform the operations specified in the instructions.

Electronic device 110 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Electronic device 110 can be coupled via bus 402 to a display 412, such as a cathode ray tube (CRT), an LCD display, or a touchscreen, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 110 can implement the techniques and other features described herein using customized hard-wired logic, one or more ASICs or FPGAs, firmware and/or program logic which in combination with the electronic device causes or programs electronic device 110 to be a special-purpose machine. According to some embodiments, the techniques and other features described herein are performed by electronic device 110 in response to one or more processors 404 executing one or more sequences of one or more instructions contained in main memory 406. Such instructions can be read into main memory 406 from another storage medium, such as storage device 410. Execution of the sequences of instructions contained in main memory 406 causes processor 404 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to electronic device 110 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 404.

Electronic device 110 also includes a communication interface 418 coupled to bus 402. Communication interface 418 provides a two-way data communication coupling to a network link 420 that is connected to a local network 422. For example, communication interface 418 can be an integrated services digital network (ISDN) card, cable modem, satellite modem, or a modem to provide a data communication connection to a corresponding type of telephone line. As another example, communication interface 418 can be a local area network (LAN) card to provide a data communication connection to a compatible LAN. Wireless links can also be implemented. In any such implementation, communication interface 418 sends and receives electrical, electromagnetic or optical signals that carry digital data streams representing various types of information.

Network link 420 typically provides data communication through one or more networks to other data devices. For example, network link 420 can provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from electronic device 110, are example forms of transmission media.

Electronic device 110 can send messages and receive data, including program code, through the network(s), network link 420 and communication interface 418. In the Internet example, a server 430 might transmit a requested code for an application program through Internet 428, ISP 426, local network 422 and communication interface 418.

The received code can be executed by processor 404 as it is received, and/or stored in storage device 410, or other non-volatile storage for later execution.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the exemplary methods or processes disclosed herein.

What is claimed is:

1. An electronic device comprising:
one or more non-transitory computer-readable storage media configured to store instructions; and
one or more processors configured to execute the instructions stored on the one or more non-transitory computer-readable storage media to cause the electronic device to:
determine sender data from a message, the sender data comprising a first domain name of a sender address;
determine a recipient address from the message, the recipient address comprising a second domain name different from the first domain name;
finding a mismatch between the first domain name of the sender address and the second domain name of the recipient address;
finding a relationship between another part of the recipient address and at least a portion of the sender data;
determine that the recipient address and the sender address are related to a same user based on the mismatch and the relationship;
determine that the message comprises confidential content; and
flag the message based at least in part on the determination that the recipient address and the sender address are related to a same user.

2. The electronic device of claim 1, wherein the sender data comprises a first username.

3. The electronic device of claim 1, wherein the relationship between the another part of the recipient address and the at least a portion of the sender data comprises matching at least data portions of the recipient address with the sender address, the first name of the sender, or the last name of the sender.

4. The electronic device of claim 1, wherein the first domain name is associated with a particular business and the second domain name is associated with an entity that provides electronic communication accounts to consumers.

5. The electronic device of claim 1, wherein the first domain name is associated with an entity that provides electronic communication accounts to consumers and the second domain name is associated with a particular business.

6. The electronic device of claim 1, further comprising:
determine a probability that the message is unauthorized, wherein said flagging the message is based on the determined probability.

7. The electronic device of claim 1, wherein the another part of the recipient address is the second domain name and the at least a portion of the sender data is a surname of the sender included in the sender address.

8. A computerized method, performed by one or more processors configured to execute instructions stored on a non-transitory computer-readable storage media, comprising:
determining sender data from a message, the sender data comprising a first domain name of a sender address;
determining a recipient address from the message, the recipient address comprising a second domain name different from the first domain name;
finding a mismatch between the first domain name of the sender address and the second domain name of the recipient address;
finding a relationship between another part of the recipient address and at least a portion of the sender data;
determining that the recipient address and the sender address are related to a same user based on the mismatch and the relationship; and
flagging the message based at least in part on the determination that the recipient address and the sender address are related to a same user.

9. The method of claim 8, wherein the sender data comprises a first username.

10. The method of claim 8, wherein the relationship between the another part of the recipient address and the at least a portion of the sender data comprises matching at least data portions of the recipient address with the sender address, the first name of the sender, or the last name of the sender.

11. The method of claim 8, wherein the first domain name is associated with a particular business and the second domain name is associated with an entity that provides electronic communication accounts to consumers.

12. The method of claim 8, wherein the first domain name is associated with an entity that provides electronic communication accounts to consumers and the second domain name is associated with a particular business.

13. The method of claim 8, further comprising:
determine a probability that the message is unauthorized, wherein said flagging the message is based on the determined probability.

14. The method of claim 8, wherein the another part of the recipient address is the second domain name and the at least a portion of the sender data is a surname of the sender included in the sender address.

* * * * *